US008699111B2

(12) United States Patent
Dillon et al.

(10) Patent No.: US 8,699,111 B2
(45) Date of Patent: Apr. 15, 2014

(54) APPARATUS AND METHOD FOR HIGH-SPEED PHASE SHIFTING FOR INTERFEROMETRIC MEASUREMENT SYSTEMS

(75) Inventors: Robert F. Dillon, Bedford, NH (US);
Neil H. K. Judell, Newton, MA (US);
Timothy I. Fillion, Bedford, MA (US);
Gurpreet Singh, Providence, RI (US);
Nathan E. Wallace, Tyngsborough, MA (US)

(73) Assignee: Dimensional Photonics International, Inc.

( * ) Notice: Subject to any disclaimer, the term of this patent is extended or adjusted under 35 U.S.C. 154(b) by 183 days.

(21) Appl. No.: 13/201,687

(22) PCT Filed: Feb. 23, 2009

(86) PCT No.: PCT/US2009/034860
§ 371 (c)(1),
(2), (4) Date: Aug. 16, 2011

(87) PCT Pub. No.: WO2010/096062
PCT Pub. Date: Aug. 26, 2010

(65) Prior Publication Data
US 2011/0299094 A1    Dec. 8, 2011

(51) Int. Cl.
*G02B 26/08*  (2006.01)
*G03H 1/12*  (2006.01)
*G06K 9/00*  (2006.01)
*G01J 1/20*  (2006.01)
*G01B 9/10*  (2006.01)

(52) U.S. Cl.
USPC .............. 359/209.1; 359/11; 359/22; 359/28; 359/30; 382/154; 348/40; 378/62; 378/87; 342/179; 356/450; 356/456; 250/201.9; 250/227.2; 250/227.21; 250/227.27

(58) Field of Classification Search
USPC .................. 359/22, 24, 28, 30, 32, 11, 209.1; 356/450, 456; 250/201.9, 227.2, 250/227.21, 227.27; 342/179; 708/816; 378/62, 87; 348/40; 382/154
See application file for complete search history.

(56) References Cited

U.S. PATENT DOCUMENTS 4,575,805 A    3/1986    Moermann
(Continued)

FOREIGN PATENT DOCUMENTS

CN    1358996 A    7/2002
(Continued)

OTHER PUBLICATIONS

International Search Report and Written Opinion for PCT/US09/34860, Apr. 17, 2009, 8 pages.
(Continued)

*Primary Examiner* — Evelyn A. Lester
(74) *Attorney, Agent, or Firm* — Schmeiser, Olsen & Watts LLP; William G. Guerin

(57) ABSTRACT

Described are a method and apparatus for high-speed phase shifting of an optical beam. A transparent plate having regions of different optical thickness is illuminated by an optical beam along a path of incidence that extends through the regions. The transparent plate can be moved or the optical beam can be steered to generate the path of incidence. The optical beam exiting the transparent plate has an instantaneous phase value according to the region in which the optical beam is incident. Advantageously, the phase values are repeatable and stable regardless of the location of incidence of the optical beam within the respective regions, and phase changes at high modulation rates are possible. The method and apparatus can be used to modulate a phase difference of a pair of coherent optical beams such as in an interferometric fringe projection system.

23 Claims, 12 Drawing Sheets

(56) References Cited

U.S. PATENT DOCUMENTS

| | | | |
|---|---|---|---|
| 4,964,770 A | 10/1990 | Steinbichler | |
| 5,107,357 A | 4/1992 | Cassarly et al. | |
| 5,151,814 A * | 9/1992 | Grinberg et al. | 359/209.1 |
| 5,308,721 A | 5/1994 | Garofalo et al. | |
| 5,479,238 A | 12/1995 | Whitney | |
| 6,324,139 B1 | 11/2001 | Nakane | |
| 6,341,105 B1 | 1/2002 | Nakane | |
| 6,396,617 B1 * | 5/2002 | Scalora | 359/248 |
| 7,227,687 B1 * | 6/2007 | Trisnadi et al. | 359/559 |
| 7,305,110 B2 | 12/2007 | Rubbert | |
| 7,492,501 B2 * | 2/2009 | Kitamura | 359/290 |
| 7,609,388 B2 | 10/2009 | Arieli et al. | |
| 2005/0007603 A1 | 1/2005 | Arieli et al. | |

FOREIGN PATENT DOCUMENTS

| | | | |
|---|---|---|---|
| JP | 05249417 A * | 9/1993 | 359/279 |
| JP | 06290485 | 10/1994 | |
| JP | 2002005616 | 1/2002 | |
| JP | 2003-084206 | 3/2003 | |
| JP | 2006047241 | 2/2006 | |
| JP | 2006329834 | 12/2006 | |

OTHER PUBLICATIONS

First Chinese Office Action in related Chinese patent application No. 200980157229.3, mailed on Dec. 14, 2012; 22 pages.

Office Action in related Japanese patent application No. 2011-551046, mailed on Jun. 11, 2013; 11 pages.

Second Office Action in related Chinese patent application No. 200980157229.3, mailed on Oct. 8, 2013; 16 pages.

Office Action in related Japanese patent application No. 2011-551046, mailed on Jan. 8, 2014; 3 pages.

* cited by examiner

APPARATUS AND METHOD FOR HIGH-SPEED PHASE SHIFTING FOR INTERFEROMETRIC MEASUREMENT SYSTEMS

FIELD OF THE INVENTION

The invention relates generally to high-speed phase shifting of an optical beam and more particularly to high-speed phase shifting of interferometric fringe patterns for three-dimensional imaging systems.

BACKGROUND OF THE INVENTION

Precision non-contact three-dimensional (3D) metrology based on fringe interferometry has been developed for a range of industrial applications. Generally measurements are made over large volumes at low data acquisition speeds. For a variety of applications such as medical and dental imaging a 3D imaging system typically requires high spatial resolution and short measurement durations. Furthermore, many systems are limited in size to enable use by an operator such as a technician, doctor or dentist. PCT Patent Application No. PCT/US08/80940, incorporated by reference herein, describes examples of compact 3D imaging systems.

Conventional systems addressing the above limitations are limited in speed due to the requirement to accurately move (i.e., phase shift) fringes projected onto the surface of the object being measured. Some systems are based on moving a component in the fringe projector with submicron precision. Other systems require precision motion of a fringe projector in small steps. For example, U.S. Pat. No. 4,964,770 discloses a 3D measurement system which projects a pattern of stripes on the surface of a tooth. An image of the stripe pattern is acquired before the stripe projector is moved to other positions where additional images of the stripe pattern are acquired. Thus the system depends on precision motion of the stripe projector, projector pointing stability and the stability of the object (tooth) throughout the data acquisition interval.

Phase Measurement Interferometry (PMI) techniques are used in some precision non-contact 3D metrology systems where coherent radiation scattered from an object to be measured is combined with a coherent reference beam to generate an interference fringe pattern at a detector array. The phase of the reference beam is varied and images of the fringe patterns are acquired for multiple phase values.

Accordion Fringe Interferometry (AFI) techniques, as described, for example, in U.S. Pat. No. 5,870,191 and incorporated by reference herein, utilize a fringe projector that includes two closely-spaced coherent light sources to project an interferometric fringe pattern onto an object to be measured. Two (or more) precision shifts in the phase difference of the two light sources are made and at least one image of the fringe pattern is acquired for each of the three (or more) phase differences. Techniques used to achieve the phase shifts include precise translation of a diffraction grating and precise repositioning of an optical fiber. Both techniques rely on mechanical translation mechanisms capable of submicron positioning stability and systems employing these techniques are limited in data acquisition speed due to the settling time of the translation mechanisms.

SUMMARY OF THE INVENTION

In one aspect, the invention features a method for modulating a phase of an optical beam. A transparent plate having a first region and a second region of different optical thickness is illuminated with an optical beam along a first segment of a path of incidence in the first region. The optical beam, after propagating through the first region of the transparent plate, has a phase determined according to the optical thickness of the first region and is independent of a location of incidence within the first region. The transparent plate is illuminated with the optical beam along a second segment of the path of incidence in the second region. The first and second segments of the path of incidence define a continuous path that crosses a transition between the first and second regions. A switching time between the first and second regions is substantially less than a transit time of the optical beam in each of the first and second regions. The optical beam, after propagating through the second region of the transparent plate, has a phase determined according to the optical thickness of the second region and is independent of a location of incidence within the second region In another aspect, the invention features an apparatus for high-speed phase shifting of an optical beam. The apparatus includes a transparent plate having a first region and a second region. Each region has an optical thickness different from the optical thickness of the other region. The apparatus also includes a relative translation mechanism to translate a location of incidence of an optical beam propagating through the transparent plate. The location of incidence is translated along a continuous path of incidence extending through at least a portion of each of the first and second regions. A transition time of the optical beam between the first and second regions is substantially less than a transit time of the optical beam in each of the two regions. The optical beam, after propagation through the transparent plate at each region, has a phase determined according to the respective optical thickness. The phase is independent of a location of incidence within the respective region.

In still another aspect, the invention features a method for modulating a phase difference of a pair of coherent optical beams. A transparent plate is illuminated at a first time with a pair of coherent optical beams. The transparent plate has a first region having a first optical thickness and a second region having a second optical thickness. Each of the coherent optical beams is incident at the transparent plate at one of the first and second regions and a phase difference of the pair of coherent optical beams exiting the transparent plate has a first value. The transparent plate is illuminated at a second time with the pair of coherent optical beams so that one of the coherent optical beams is incident at the transparent plate in a region different from the respective region for the coherent optical beam for the first time so that the phase difference of the pair of coherent optical beams exiting the transparent plate has a second value. The transparent plate is illuminated at a third time with the pair of coherent optical beams so that one of the coherent optical beams is incident at the transparent plate in a region different from the respective region for the coherent optical beam for the second time so that the phase difference of the pair of coherent optical beams exiting the transparent plate has a third value.

In yet another aspect, the invention features an apparatus for modulating a phase difference of a pair of coherent optical beams. The apparatus includes a transparent plate having a first region with a first optical thickness and a second region with a second optical thickness. The transparent plate is adapted to receive a pair of coherent optical beams. The apparatus also includes a cyclical motion mechanism coupled to the transparent plate. The cyclical motion mechanism is adapted for planar translation. Each of the coherent optical beams is incident at the transparent plate at one of the first and second regions and is phase delayed according to the optical thickness at the respective region. The location of incidence of each of the coherent optical beams traverses a cyclical path defined by the planar translation so that a phase difference of the coherent optical beams is periodically modulated according to a difference in the optical thicknesses as the locations of incidence of the coherent optical beams transition between the first and second regions.

In yet another aspect, the invention features a fringe projection and imaging system. The system includes a transparent plate, a cyclical motion mechanism, an imager and a control module. The transparent plate is adapted to receive a pair of coherent optical beams and has a first region having a first optical thickness and a second region having a second optical thickness. The cyclical motion mechanism is coupled to the transparent plate and is adapted for planar translation. Each of the coherent optical beams is incident at the transparent plate at one of the first and second regions, and is phase delayed according to the optical thickness of the respective region. The location of incidence of each coherent optical beam traverses a cyclical path defined by the planar translation so that a phase difference of the coherent optical beams is periodically modulated. The modulation is based on a difference in the optical thicknesses as the locations of incidence of the coherent optical beams transition between the first and second regions. The imager is configured to acquire images of fringe patterns generated on a surface illuminated by the coherent optical beams after exiting the phase plate. Images are acquired for a plurality of values of phase difference for the coherent optical beams. The control module is in electrical communication with the cyclical motion mechanism and the imager, and synchronizes the acquisition of the image of the fringe pattern for each of the phase differences.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview the invention relates to a method and apparatus for high-speed modulation of a phase of an optical beam. A transparent plate having regions of different optical thickness is illuminated with an optical beam. The beam is incident along a path that includes segments in the different regions. The path is established by moving the optical beam relative to the transparent plate. For example, the optical beam can be steered or the transparent plate can be translated. The phase of the optical beam after propagation through the transparent plate is determined according to the optical thickness for the region in which the beam is currently incident. As the optical thickness uniformity within a region is constant, the phase of the beam remains stable while the beam remains incident in a region even if the location of incidence in the region changes. Rapid translation or beam steering enables high speed switching between stable phase values.

Figure 1A:
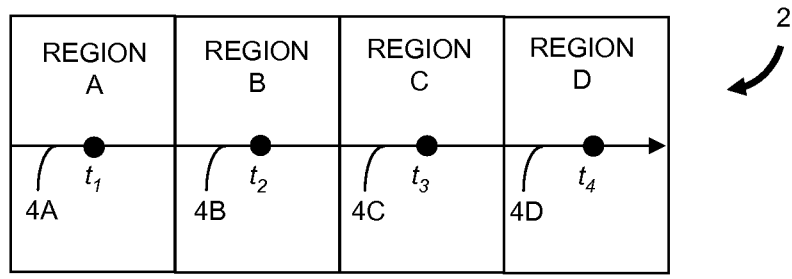
FIG. 1A illustrates a path of incidence for an optical beam illuminating a phase plate.
Figure 1B:
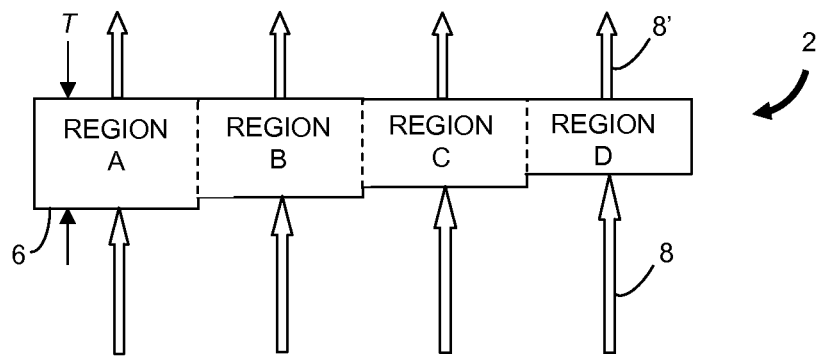
FIG. 1B illustrates the location of incidence for the optical beam of FIG. 1A for each of four times $t_1$, $t_2$, $t_3$ and $t_4$.

FIGS. 1A and 1B show a front view and a top view, respectively, of a phase plate 2 having four regions (Region A to Region D) of different optical thickness. The phase plate 2 is fabricated from an optical quality transparent plate. The optical thickness of each region is determined according to the physical thickness of the plate for the region. As illustrated, Region A has an optical thickness determined by the product of the plate thickness T and the refractive index of the optical glass. Regions B, C and D have progressively lesser physical thickness and therefore progressively lesser optical thickness. In an alternative embodiment, the phase plate 2 has a nominal thickness and one or more regions of increased thickness are provided. In another alternative embodiment, the regions have the same physical thickness; however, the refractive index of each region is different from the refractive index of each of the other regions.

The phase plate 2 can be generated with the desired pattern of spatially-varying optical thickness by using a standard ion milling process for a spatially-selective reduction in the physical thickness of an optical quality transparent plate or window. The width of the transition between adjacent regions can be as small as 1 μm or less. The value of the phase delay for a beam 8 propagating through the phase plate 2 is dependent on the wavelength of the beam 8, the difference in the plate thicknesses for the regions, and the index of refraction of the phase plate 2.

FIG. 1A shows a path of incidence 4 for an optical beam 8 illuminating the front surface 4 of the phase plate 2. The path 4 is defined sequentially in time from left to right by the instantaneous position of the location of incidence. The location of incidence is changed by moving the phase plate 2 and/or by steering the optical beam 8. The path 4 includes four segments 4A, 4B, 4C and 4D with each segment corresponding to a portion of the path 4 in the respective region. The transit time, defined herein as the time for the location of incidence to enter a region until the location of incidence subsequently exits the region, is substantially longer than the transition time between constant phase delays. Four discrete locations of incidence are depicted for times $t_1$, $t_2$, $t_3$ and $t_4$. FIG. 1B illustrates the location of the incident optical beam 8 for each of the four times $t_1$, $t_2$, $t_3$ and $t_4$.

Figure 1C:
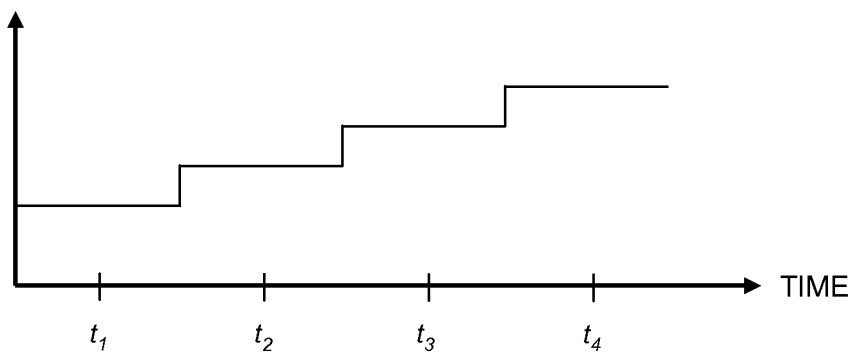
FIG. 1C graphically depicts the phase of the optical beam of FIG. 1A after exiting the phase plate as a function of time.

FIG. 1C graphically depicts the phase of the optical beam 8' as it exits the phase plate 2 as a function of time. The phase depends on the optical thickness for the region in which the beam 8 is incident therefore four different values of phase are achieved. The phase is highly stable as long as the optical beam 8 remains in a single region regardless of the location of incidence in the region. For example, the variation in phase over a region can be less than 0.1° for visible wavelengths. This phase stability is due to the thickness uniformity for each region. Moreover, the phase for the beam 8' is independent of the rate of change of the location of incidence as long as the beam 8 remains within a region. The phase of the optical beam 8' exiting the phase plate 2 changes rapidly when the location of incidence transitions from one region to an adjacent region, i.e., as the path 4 transitions from one segment to the next segment. The rate of change of phase is determined according to the beam size (e.g., diameter) at the phase plate 2, the finite width for the transition in optical thickness between adjacent regions and the rate of change for the location of incidence along the plate surface 6. Thus, to quickly switch between phase values, a high rate of change of the location of incidence is preferred and the beam size at the phase plate 2 should be small compared to the lateral dimensions of the regions. For example, a rate of change of 100 mm/sec and a beam size of 1 μm results in a 10 μs switching time. To achieve a small beam size, the optical beam is focused onto or near the plate surface 6.

In some embodiments, the optical beam 8 is focused on or near the plate surface 6 so the time for the phase to transition between two constant values is reduced. Alternatively or in addition, the phase plate 2 can be moved at a high translation rate to reduce the phase transition time.

In an alternative embodiment, the optical beam 8 is steered using a beam director to generate the desired path of incidence 4. For example, the beam director can be an acousto-optic modulator that enables rapid and repeatable steering of the beam 8 with electronic control. In other examples, the beam director is a steerable mirror or refractive element used to direct the optical beam 8 along the path of incidence 4.

Although the phase plate 2 described above includes regions of different optical thickness arranged in a linear configuration, it should be recognized that other geometric configurations of regions are possible. Moreover, the path of incidence 4 is not required to be linear but can be any two-dimensional path that when used with a specific geometrical layout of regions results in a desired temporal phase characteristic (i.e., "phase profile") for the exiting optical beam 8'. In still other embodiments, the rate of translation of the location of incidence varies according to the desired phase profile and/or geometrical layout of the regions.

Conventional techniques employed to achieve high accuracy phase shifting include using piezoelectric actuators to adjust the position of an optical element such as a mirror; however, piezoelectric actuators typically require several milliseconds or more to transition between phase values. In contrast, electro-optical modulators such as lithium niobate modulators can change the phase of an optical beam at rates that exceed 1 GHz; however, electro-optic modulators are generally much less accurate for phase control. Moreover, the phase stability of electro-optic modulators typically depends on environmental conditions and therefore temperature control is usually required for applications requiring accurate phase control. As the differential in glass thickness for the phase plate 2 of FIG. 1 is typically small (i.e., a fraction of the wavelength of the optical beam 8), significant changes in temperate can be tolerated without a substantial reduction in phase shift accuracy. Thus the illustrated phase plate 2, when combined with a relative translation mechanism, that is, either a beam director or a translation mechanism, enables both high accuracy phase shifting and a high switching bandwidth to a degree not obtainable by conventional methods of phase shifting.

The method and apparatus of the invention have applications in interferometric fringe projection and imaging systems such as those used in 3D AFI measurement system for determining positional information of points on the surface of an object. Such 3D measurement systems can be used in dental applications for intra-oral imaging of surfaces such as the enamel surface of teeth, the dentin substructure of teeth, gum tissue and various dental structures (e.g., posts, inserts and fillings). The method and apparatus enable high accuracy 3D measurements to be performed in real-time without the problems associated with settling time issues associated with mechanisms employed in prior art interferometric fringe projection devices.

Figure 2:
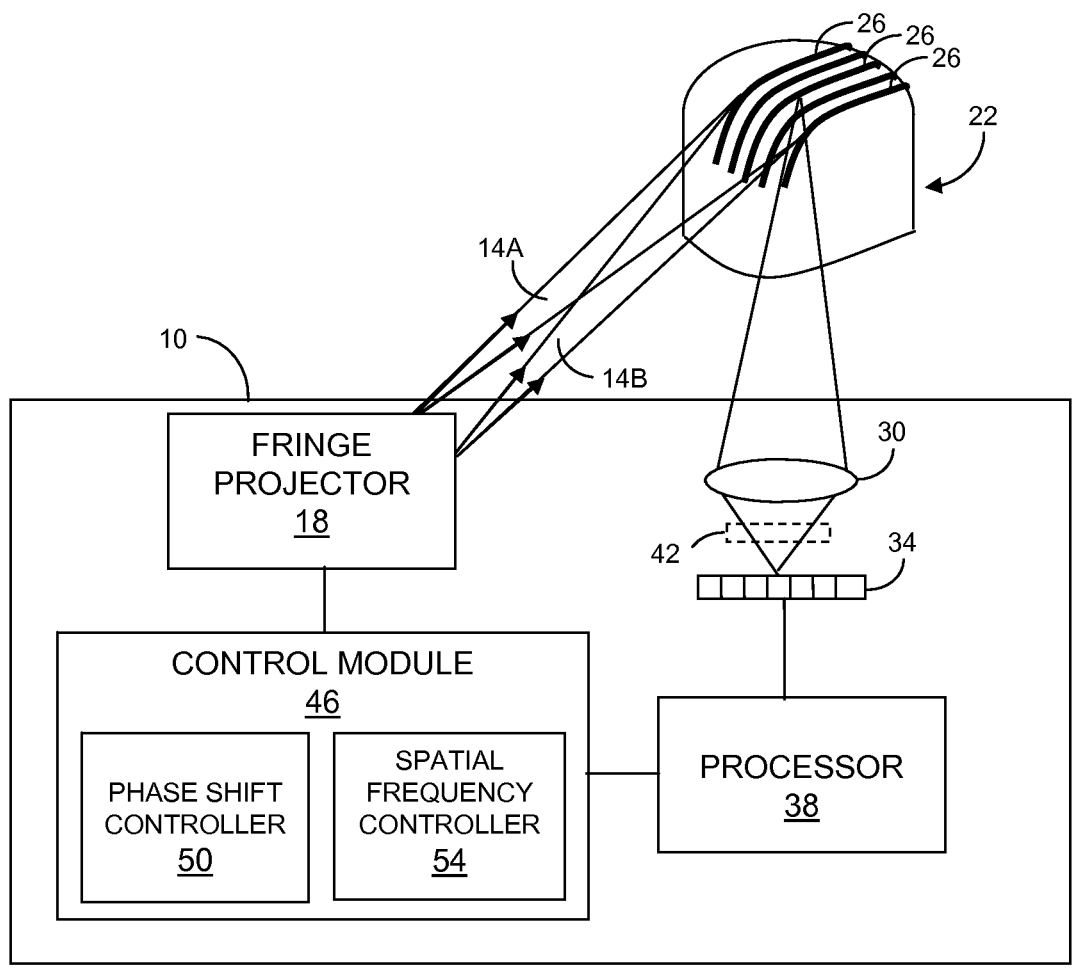
FIG. 2 illustrates a 3D measurement system for which a phase difference of a pair of coherent optical beams is modulated according to an embodiment of the invention.

FIG. 2 illustrates a 3D measurement system 10 such as an AFI measurement system in which a phase difference of a pair of coherent optical beams is modulated according to an embodiment of the invention. Two coherent optical beams 14A and 14B (generally 14) are generated by a fringe projector 18 and used to illuminate the surface of an object 22 with a pattern of interference fringes 26. An image of the fringe pattern at the object 22 is formed by an imaging system or lens 30 onto an imager that includes an array of photodetectors 34. For example, the detector array 34 can be a two-dimensional charge coupled device (CCD) imaging array. An output signal is generated by the detector array 34 and provided to a processor 38. The output signal includes information on the intensity of the radiation received at each photodetector in the array 34. An optional polarizer 42 is oriented to coincide with the main polarization component of the scattered radiation. A control module 46 controls parameters of the two coherent optical beams 14 emitted from the fringe projector 18. The control module 46 includes a phase shift controller 50 to adjust the phase difference of the two beams 14 and a spatial frequency controller 54 to adjust the pitch, or separation, of the interference fringes 26 at the object 22.

The spatial frequency of the fringe pattern is determined by the separation of two virtual sources of coherent optical radiation in the fringe generator 18, the distance from the virtual sources to the object 22, and the wavelength of the radiation. As used herein, a virtual source means a point from which radiation appears to originate although the actual source of the radiation may be located elsewhere. The processor 38 and control module 46 communicate to coordinate the processing of signals from the photodetector array 34 with respect to changes in phase difference and spatial frequency, and the processor 38 determines three-dimensional information for the object surface according to the fringe pattern images.

In one embodiment, the fringe projector 18 includes a phase plate coupled to a cyclical motion mechanism that is controlled by the phase shift controller 50. The phase plate has a nominal optical thickness and one or more regions of a different optical thickness. Thus the phase of an optical beam incident at the surface of the phase plate is delayed or advanced relative to the phase of the optical beam at a different location of incidence where the phase plate has the different optical thickness. To achieve three distinct values of phase difference between the beams 14, a phase plate having a nominal optical thickness and one or more regions of a different optical thickness is positioned in three distinct positions as follows:

a) both beams 14 pass through the nominal optical thickness;
b) one beam 14A passes through the nominal optical thickness and the other beam 14B passes through a region of the plate having the different optical thickness; and
c) one beam 14A passes through a region of the plate having the different optical thickness and the other beam 14B passes through the nominal optical thickness.

In one embodiment, the difference between the two plate thicknesses is selected to provide a shift of 120° in the phase difference between the beams 14 as the beam incidence at the phase plate for one of the beams 14 transitions between the regions of different thickness.

Figure 3:
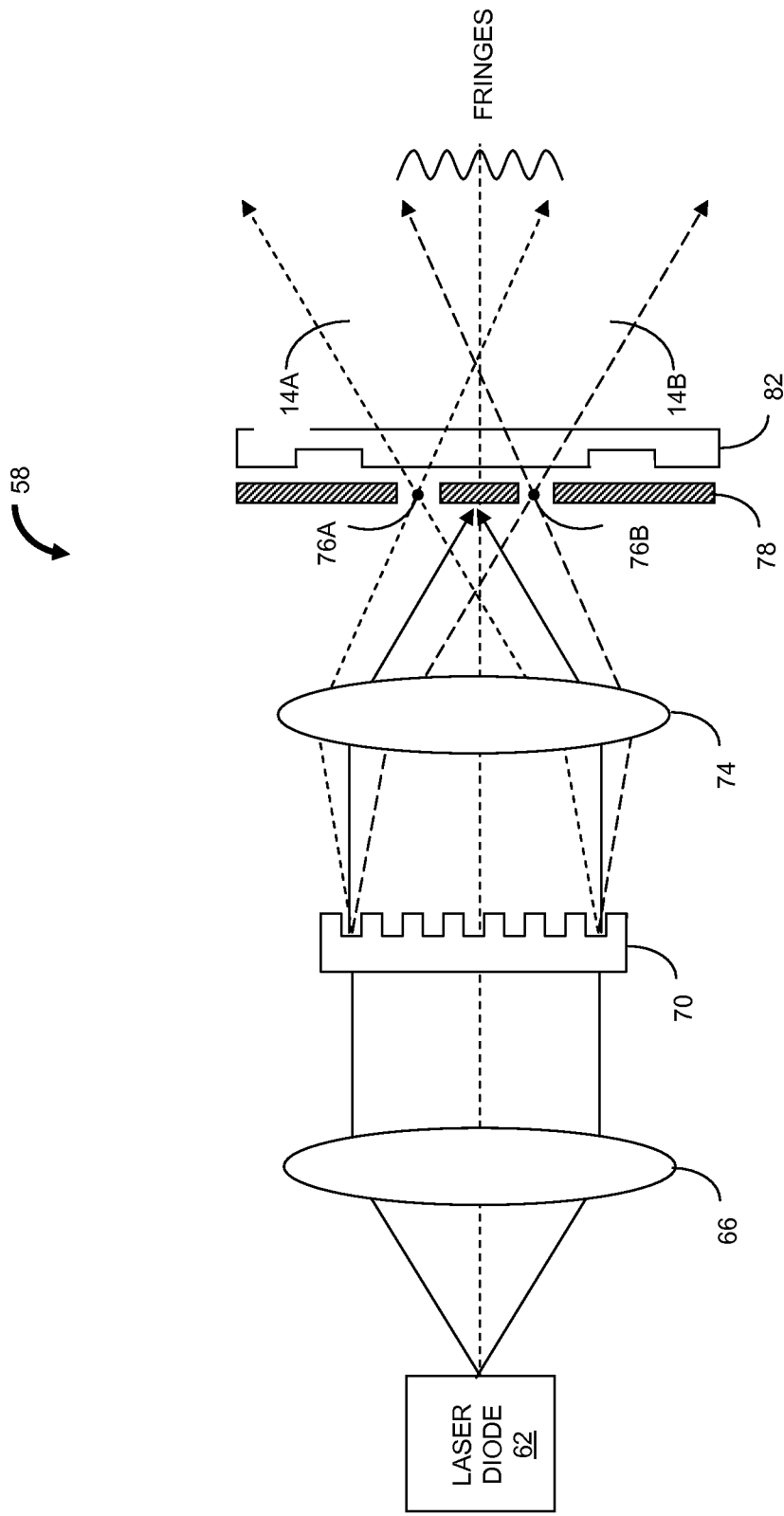
FIG. 3 illustrates an embodiment of an interferometric fringe projector that includes an apparatus for modulating a phase difference of a pair of coherent optical beams according to the invention.

FIG. 3 illustrates one embodiment of an interferometric fringe projector 58 that includes an apparatus for modulating a phase difference of a pair of coherent optical beams 14. The apparatus enables rapid changes in the phase difference while maintaining a stable and accurate phase difference after transitions in phase. The fringe projector 58 includes a laser diode 62, collimating lens 66, diffraction grating 70, focusing lens 74, dual pin hole mask 78 and a phase plate 82 having regions of different thickness. The laser diode 62 emits a divergent beam of coherent radiation that is collimated by the collimating lens 66. The collimated beam is incident on the diffraction grating 70 and diffracted along one axis into multiple beams of different order. The focusing lens 74 generates a beam waist (i.e., a virtual source) at the pinhole mask 78 for each of the diffracted beams. Beam waists 76A and 76B (or virtual sources, generally 76) for the +1 and −1 diffracted order beams are present in the pinhole apertures therefore the beams propagate through the mask 78; however, higher order diffracted beams are blocked. The phase plate 82 is positioned close to the mask 78 so that the cross-sectional area of the two beams 14 expanding from the virtual sources 76 have diameters at the phase plate 78 that are small relative to the lateral dimensions of the regions of different thickness. Consequently, precise positioning of the phase plate 82 is not required and translation of the phase plate 82 during image acquisition times does not affect measurement accuracy.

Figure 4:
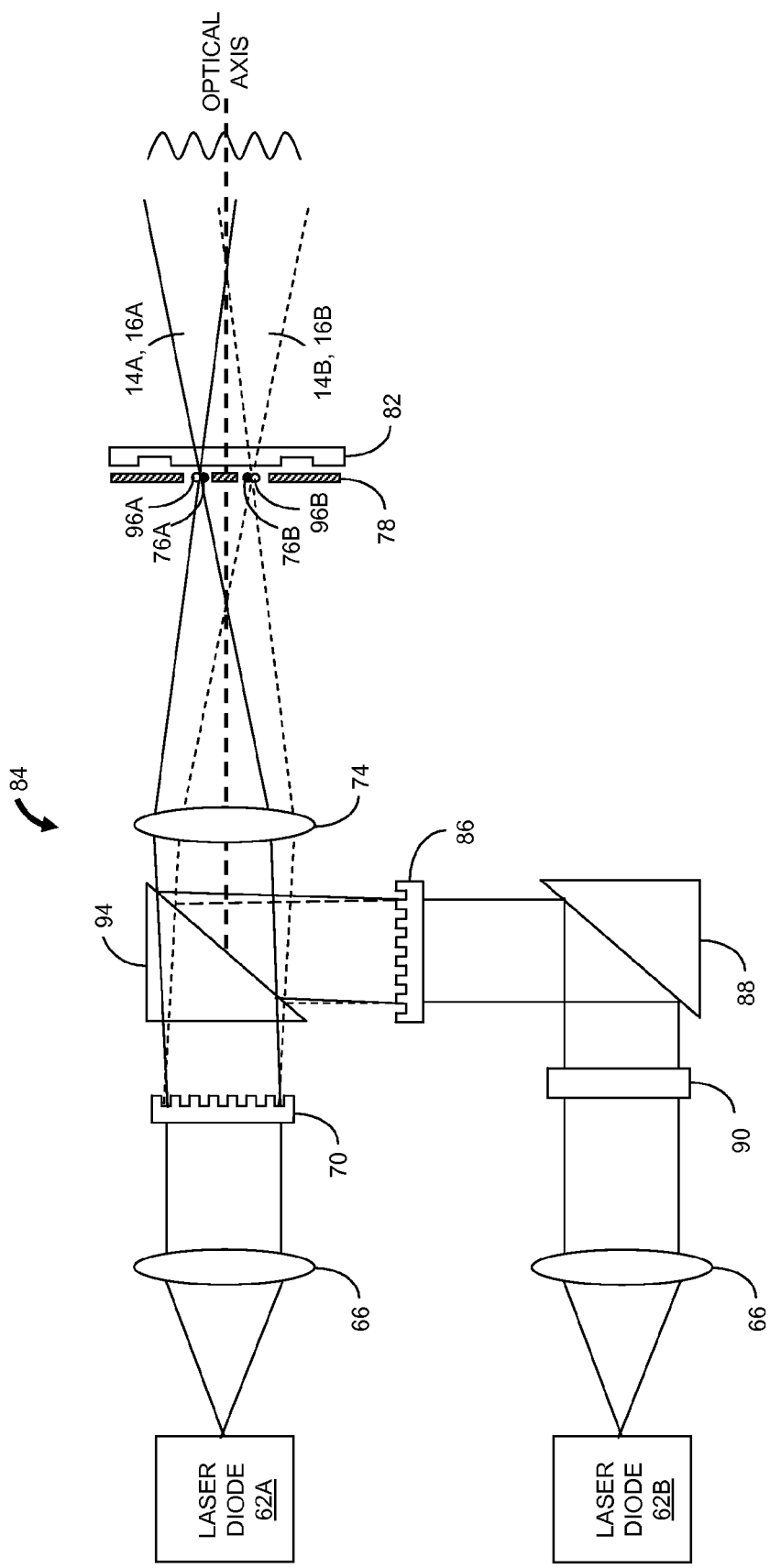
FIG. 4 illustrates another embodiment of an interferometric fringe projector according to the invention.

FIG. 4 shows another embodiment of an interferometric fringe projector 84 according to the invention. The fringe projector 84 includes components similar to those shown for the single-channel fringe projector 58 of FIG. 3; however, an additional laser diode 62B, collimating lens 66 and diffraction grating 86 are used with a fold mirror 88 in a second optical path. Both laser diodes 62 operate at substantially the same wavelength. A half wave ($\lambda/2$) waveplate 90 rotates the polarization of the radiation from the lower laser diode 62B and a polarization dependent beam combiner 94 combines the radiation from both laser diodes 62 along a common optical path. The pitches of the two diffraction gratings 70 and 84 are different therefore the angles of the orders of the diffracted beams for each laser diode 62 are different. The pitches are selected in combination with the size and location of the apertures in the pinhole mask 78 so that the beams for the +1 and −1 diffracted orders for both laser diodes 62 pass while the higher order diffracted beams are blocked.

Due to the difference in angle of the +1 and −1 diffracted beams for the two laser diodes 62, the location of the two virtual sources 76A and 96A in the upper pinhole aperture are different. Similarly, the location of the two virtual sources 76B and 96B in the lower pinhole aperture are different. Consequently, the separation of the virtual sources 76 for one laser diode 62A is different from the separation of the virtual sources 96 for the other laser diode 62B and the spatial frequencies of the two fringe patterns are different.

In operation, one laser diode 62A is active while the other laser diode 62B is disabled so that only one fringe pattern corresponding to a single pair of virtual sources 76 is generated. Subsequently, the active laser diode 62A is disabled and the other laser diode 62B is activated to provide the second pair of virtual sources 96 and second fringe pattern.

Figure 5A:
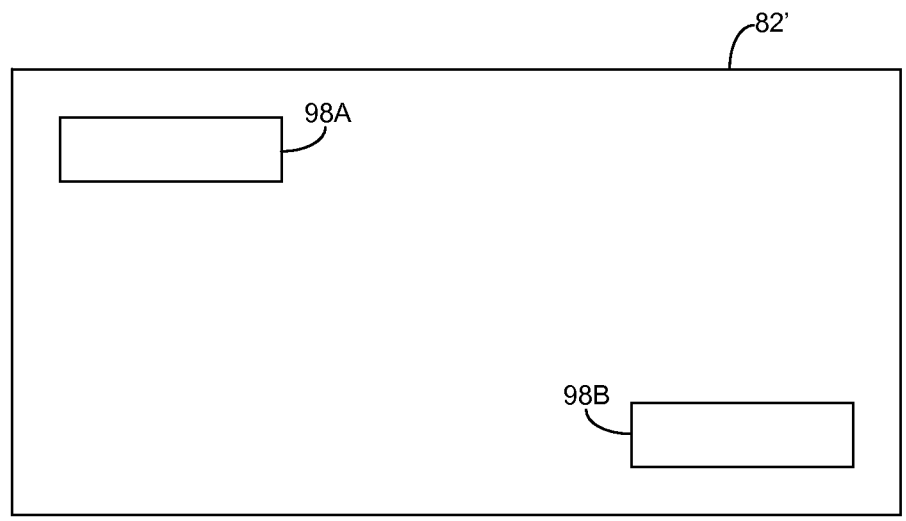
FIG. 5A and FIG. 5B illustrate a front view and a side view, respectively, of an example of the phase plate shown in FIG. 4.
Figure 5B:
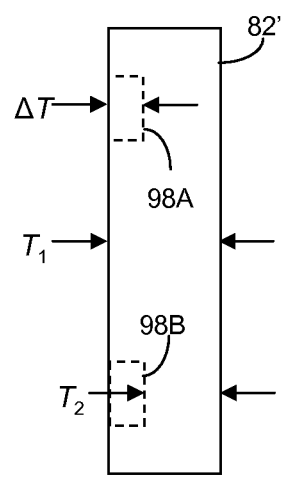

FIG. 5A and FIG. 5B show a front view and a side view, respectively, of an example of the phase plate 82 of FIG. 4. The phase plate 82' has a nominal thickness $T_1$ and two regions 98A and 98B (generally 98) of reduced thickness $T_2$. The thickness difference $\Delta T$ is chosen based upon the laser diode wavelength and the index of refraction of the phase plate 82' to achieve the desired change in the phase difference between the beams 14. In one example for laser diodes 62 operating at 405 nm, the phase plate 82' is fabricated from Corning 7980 UV Grade Fused Silica having an index of refraction of 1.4696 and a nominal thickness $t_1$ of 2.28 mm. The reduced thickness regions are ion milled to a $\Delta T$ depth of 287 nm resulting in a 120° phase shift between the nominal thickness areas and the reduced thickness areas.

Figure 6A:
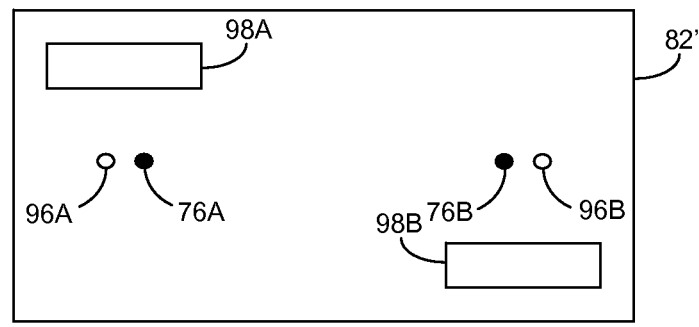
FIGS. 6A, 6B and 6C illustrate the phase plate of FIG. 5 relative to virtual sources shown in FIG. 4 for three discrete positions of the phase plate.
Figure 6B:
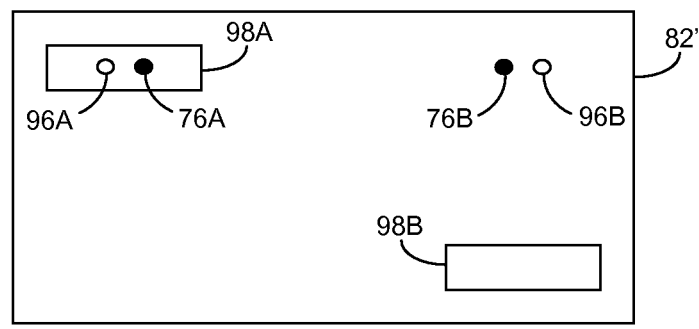
Figure 6C:
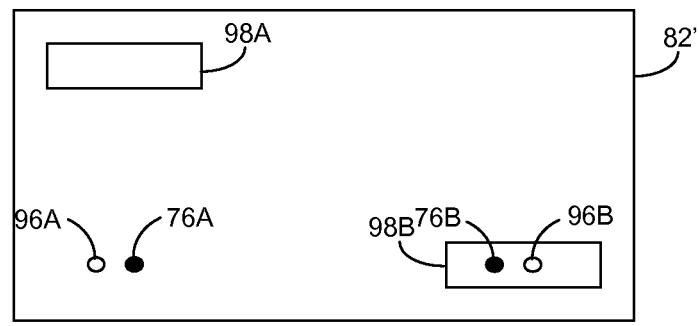

FIGS. 6A, 6B and 6C illustrate the phase plate 82' relative to the virtual sources 76 and 96 for three discrete positions. Motion of the phase plate 82' between positions is along a direction perpendicular to an axis containing the virtual sources 76 and 96, and is perpendicular to the optical axis of the fringe projector 84 (see FIG. 4).

Figure 7A:
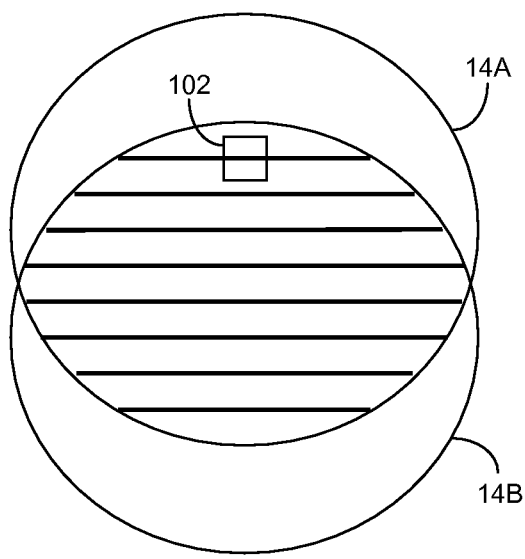
FIG. 7A is an illustration of a fringe pattern created at an object plane for a single active laser diode for the phase plate positioned as shown in FIG. 6A.
Figure 7B:
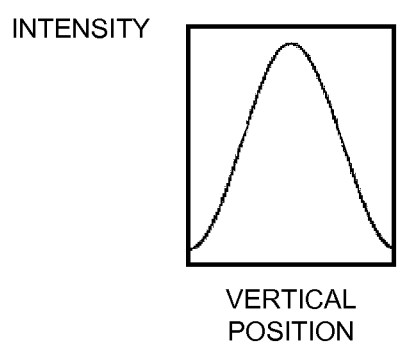
FIG. 7B graphically depicts the intensity variation across a vertical slice of the fringe pattern shown in FIG. 7A.

FIG. 7A is an illustration of a fringe pattern created at an object plane in a region of overlap between the two diverging beams 14 for a single active laser diode. The position of the phase plate 82' with respect to the virtual sources 76 and 96 corresponds to FIG. 6A where no phase difference between the beams is introduced. FIG. 7B depicts how the intensity varies across a vertical slice of a small region 102 of the fringe pattern shown in FIG. 7A. It should be recognized that a fringe pattern having a different fringe spacing is generated if the laser diode 62A is disabled and the other laser diode 62B is enabled (FIG. 4).

Figure 8A:
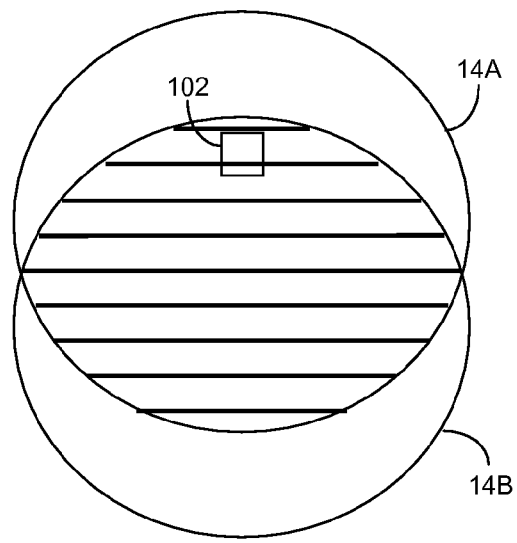
FIG. 8A is an illustration of a fringe pattern created at an object plane for a single active laser diode for the phase plate positioned as shown in FIG. 6B.
Figure 8B:
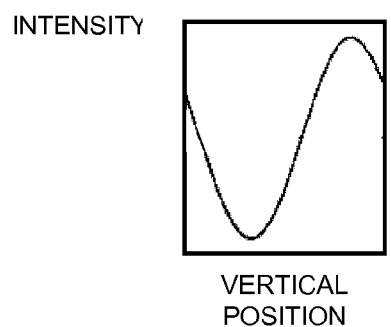
FIG. 8B graphically depicts the intensity variation across a vertical slice of the fringe pattern shown in FIG. 8A.

FIG. 6B shows the position of the virtual sources 76 and 96 for a second position of the phase plate 82'. As the beams from the first virtual sources 76A and 96A are incident at a reduced thickness region 98A, the phase of the corresponding beams exiting the phase plate 82' are advanced relative to the phase of the beams for the counterpart virtual sources 96A and 96B. For example, the change in the phase difference imparted by moving the phase plate 82' to the second position from the first position can be 120°. FIG. 8 shows the shifted fringe pattern for the first laser diode 62A achieved by moving the phase plate 82' to the second plate position.

Figure 9A:
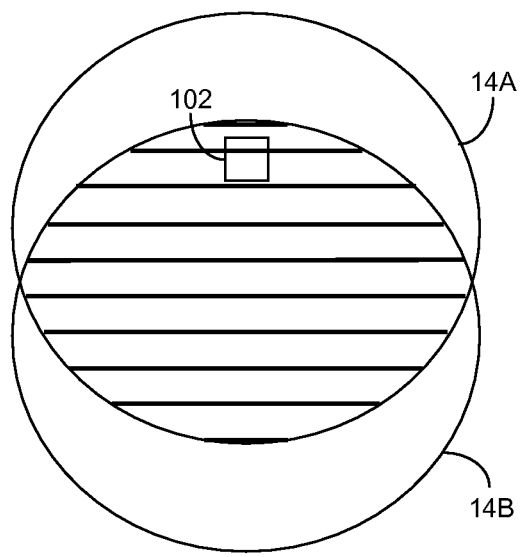
FIG. 9A is an illustration of a fringe pattern created at an object plane for a single active laser diode for the phase plate positioned as shown in FIG. 6C.
Figure 9B:
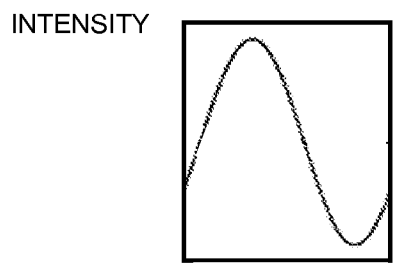
FIG. 9B graphically depicts the intensity variation across a vertical slice of the fringe pattern shown in FIG. 9A.

FIG. 6C illustrates the position of the virtual source pairs 76 and 96 for a third position of the phase plate 82'. Beams from the second virtual sources 76B and 96B are incident at a reduced thickness region 98B while beams from the first virtual sources propagate through the nominal thickness of the phase plate 82'. Consequently, the phase of the beams from the first virtual sources 76A and 96A are delayed relative to the phase of the beams from the second virtual sources 76B and 96B. For example, the change in the phase difference imparted by moving the phase plate 82' to the third position from the first position can be −120°. FIG. 9 shows the shifted fringe pattern for the first laser diode 62A achieved by moving the phase plate 82' to the third plate position.

FIGS. 7 to 9 illustrate how positioning of the phase plate 82' according to FIG. 6 achieves three distinct phase differences. Bilinear motion, that is, up and down translation of the phase plate 82' to the three positions, means that virtual sources 76 and 96 pass through the zero value phase shift position shown in FIG. 6A twice as often as the two non-zero phase shift positions shown in FIG. 6B and FIG. 6C. This leads to complexity when equal time duration desired for each of the three phase differences.

Figure 10:
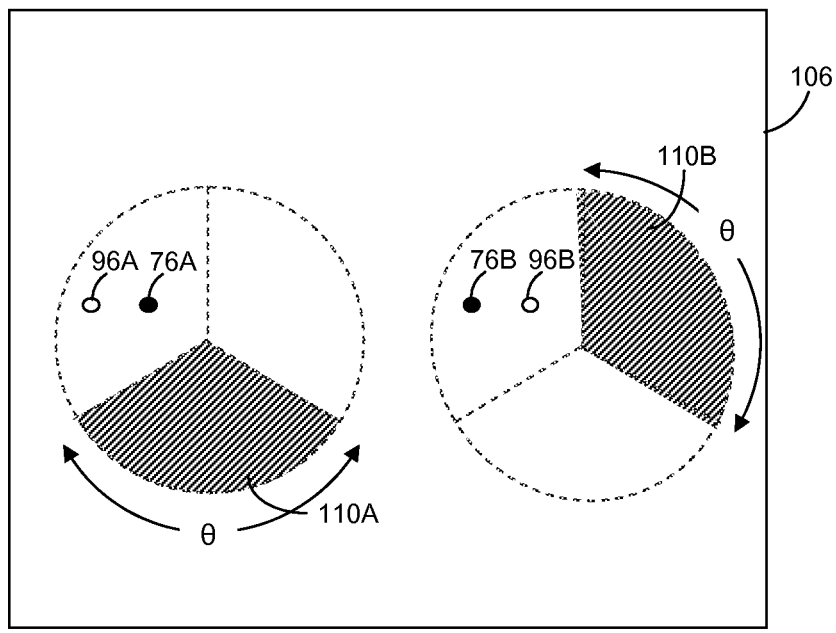
FIG. 10 illustrates a phase plate that can be used with an orbital translation mechanism to achieve a modulation of the phase difference between two coherent beams according to an embodiment of the invention.

FIG. 10 illustrates a phase plate 106 that can be used with an orbital translation mechanism to achieve a modulation of the phase difference between two coherent beams according to the invention. The phase plate 106 and orbital translation mechanism overcome complexities that arise with the bilinear translation technique described above, such as timing synchronization for image acquisition and transfer that arise from the nonlinear translation velocity profile. Similar to the phase plate 82' described above for bilinear translation, the illustrated phase plate 106 includes two regions 110A and 110B (generally 110) of reduced thickness; however, each region 110 is pie-shaped and has a wedge angle θ of 120°.

Figure 11:
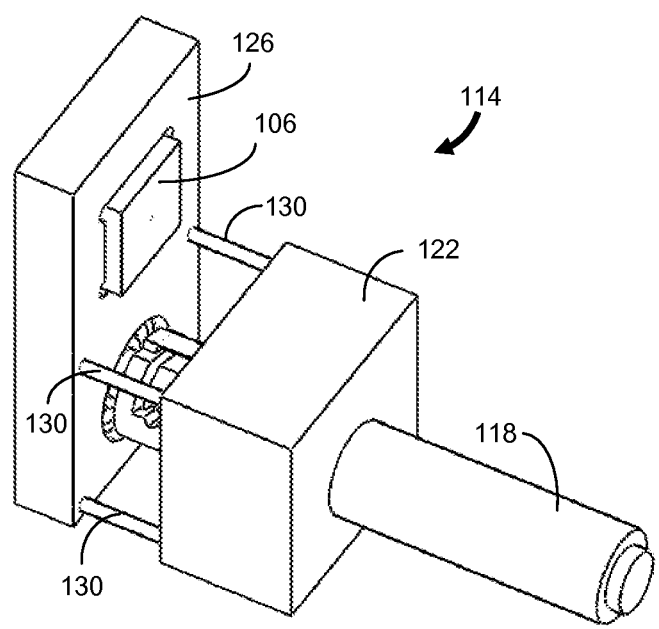
FIG. 11 shows the phase plate of FIG. 10 attached to an orbital translation mechanism according to an embodiment of the invention.

FIG. 11 shows the phase plate 106 attached to an orbital translation mechanism 114. A cam attached to a shaft of a micro-motor 118 mounted in the frame 122 of the mechanism includes a pin that extends into a bearing in an orbital plate 126. Flexible rods 130 between the frame 122 and orbital plate 126 maintain the orbital plate in a fixed plane while permitting limited planar motion. The phase plate 106 is secured at an opening in the orbital plate 126 in close proximity to a pinhole mask (not shown).

Activation of the micro-motor 118 causes planar translation of the orbital plate 126 along a circular path. Consequently, the phase plate 106 traces a circular path at a constant angular velocity for each revolution of the micro-motor shaft. As the phase plate moves along the circular path, the two regions of reduced thickness 110 sequentially move into and out of the path of virtual sources 76B and 96B and then 76A and 96A.

Figure 12:
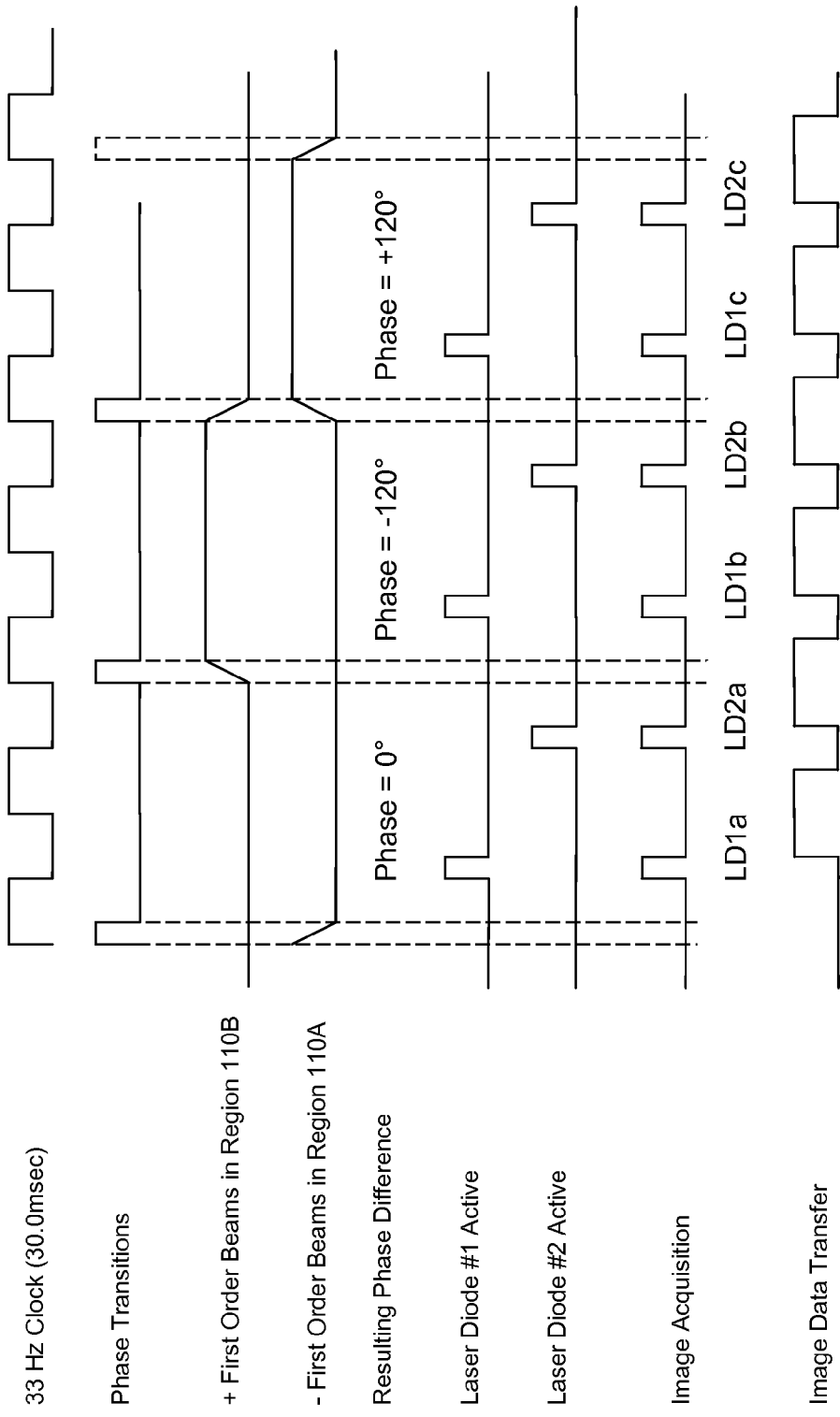
FIG. 12 is a timing diagram showing the synchronization of events during a single orbital cycle using the phase plate and orbital translation mechanism shown in FIG. 11.
Figure 13:
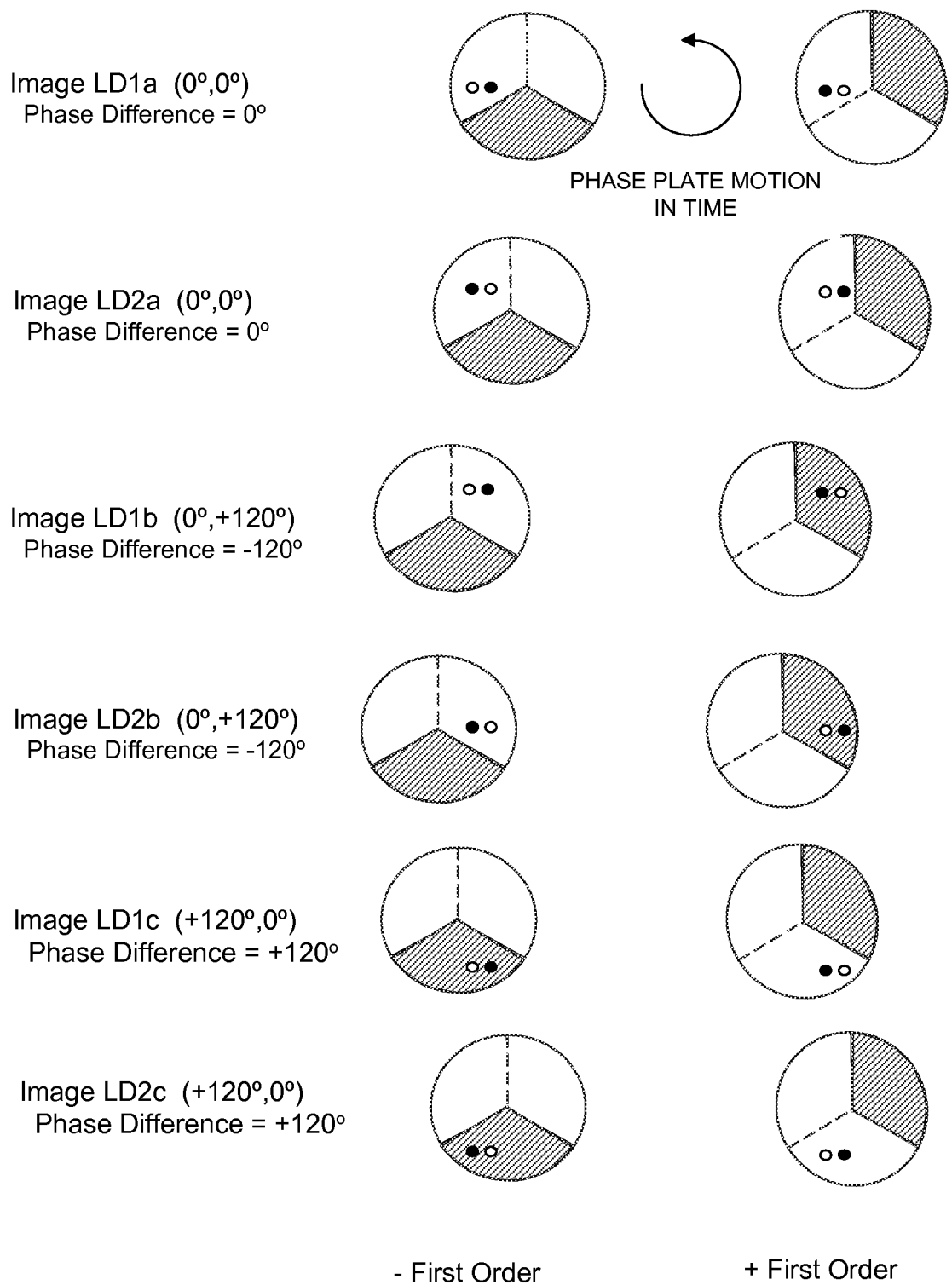
FIG. 13 shows the position of the phase plate of FIG. 11 relative to fixed positions of virtual source pairs for the image acquisition intervals of FIG. 12.

FIG. 12 is a timing diagram showing the synchronization of events during a single orbital cycle at a 33 Hz image acquisition rate (30 msec clock cycle). FIG. 13 shows the position of the phase plate 106 relative to the fixed positions of the virtual source pairs 76 and 96 for the image acquisition intervals of FIG. 12. In the illustrated example, the transition time allowed for the virtual sources 76 and 96 to cross a depth transition on the phase plate 106 is shown by vertical dashed lines and is 5 msec. Thus the phase of both the +First Order beam and −First Order beam are stable for 25 msec within each 30 msec clock cycle. A msec image acquisition time results in a ±10 msec timing tolerance.

In the illustrated example, there are six timing intervals:
1. Laser Diode 1 is enabled and image LD1a is acquired during a first timing interval for a portion of the time when both First Order beams propagate through the nominal thickness of the phase plate 106, resulting in a relative phase difference of 0° between the +First Order and −First Order beams for Laser Diode 1.
2. Laser Diode 2 is enabled and image LD2a is acquired during a second timing interval for a later portion of the time when both First Order beams propagate through the nominal thickness of the phase plate 106, resulting in a relative phase difference of 0° between the +First Order and −First Order beams for Laser Diode 2.
3. During a third timing interval, Laser Diode 1 is enabled and image LD1b is acquired during a portion of the time when the +First Order beam propagates through a reduced thickness region 110B and the −First Order beam propagates through the nominal thickness of the phase plate 106, resulting in a relative phase difference of −120° between the +First Order and −First Order beams for Laser Diode 1.
4. During a fourth timing interval Laser Diode 2 is enabled and image LD2b is acquired during a later portion of the time when the +First Order beam propagates through the reduced thickness region 110B and the −First Order beam propagates through the nominal thickness of the phase plate 106, resulting in a relative phase difference of −120° between the +First Order and −First Order beams for Laser Diode 2.
5. During a fifth timing interval, Laser Diode 1 is enabled and image LD1c is acquired during a portion of the time when the +First Order beam propagates through the nominal thickness of the phase plate 106 and the −First Order beam propagates through a reduced thickness region 110A, resulting in a relative phase difference of +120° between the +First Order and −First Order beams for Laser Diode 1.
6. During a sixth timing interval Laser Diode 2 is enabled and image LD2c is acquired during a later portion of the time when the +First Order beam propagates through the nominal thickness of the phase plate 106 and the −First Order beam propagates through the reduced thickness region 110A, resulting in a relative phase difference of +120° between the +First Order and −First Order beams for Laser Diode 2.

Other timing arrangements are possible. For example, an increased image acquisition duration is allowed if a reduction in the timing tolerance is acceptable. In addition, the duration for image data transfer can be increased as long as the transfer duration expires prior to the start of the next laser diode activation.

While the invention has been shown and described with reference to specific embodiments, it should be understood by those skilled in the art that various changes in form and detail may be made therein without departing from the spirit and scope of the invention.

What is claimed is:
1. A method for modulating a phase of an optical beam, the method comprising:
   illuminating a transparent plate having a first region and a second region of different optical thickness with an optical beam along a first segment of a path of incidence in the first region, wherein the optical beam after transmission through the first region of the transparent plate has a phase determined according to the optical thickness of the first region and is independent of a location of incidence within the first region; and
   illuminating the transparent plate with the optical beam along a second segment of the path of incidence in the second region, the first and second segments of the path of incidence defining a continuous path that crosses a transition between the first and second regions, wherein a switching time between the first and second regions is substantially less than a transit time of the optical beam in each of the first and second regions and wherein the optical beam after transmission through the second region of the transparent plate has a phase determined according to the optical thickness of the second region and is independent of a location of incidence within the second region.

2. The method of claim 1 wherein illuminating the transparent plate with the optical beam along the path of incidence comprises translating the transparent plate relative to the optical beam.

3. The method of claim 1 wherein illuminating the transparent plate with the optical beam along the path of incidence comprises steering the optical beam.

4. The method of claim 1 wherein a physical thickness of the transparent plate in the first region is different from a physical thickness of the transparent plate in the second region.

5. The method of claim 1 wherein an index of refraction of the transparent plate in the first region is different from an index of refraction of the transparent plate in the second region.

6. An apparatus for high-speed phase shifting of an optical beam, comprising:
a transparent plate having a first region and a second region each having an optical thickness different from the other region; and
a relative translation mechanism to translate a location of incidence of an optical beam propagating through the transparent plate along a continuous path of incidence extending through at least a portion of each of the first and second regions, wherein a transition time of the optical beam between the first and second regions is substantially less than a transit time of the optical beam in each region and wherein the optical beam after propagation through the transparent plate at each region has a phase determined according to the respective optical thickness, the phase being independent of a location of incidence within the respective region.

7. The apparatus of claim 6 wherein the relative translation mechanism translates the transparent plate in a plane substantially parallel to a surface of the transparent plate.

8. The apparatus of claim 6 further comprising an optical beam director to translate the location of incidence of the optical beam at the transparent plate.

9. The apparatus of claim 8 wherein the optical beam director is an acousto-optic modulator.

10. The apparatus of claim 6 wherein a physical thickness of the transparent plate in each region is different from a physical thickness of the transparent plate in each of the other regions.

11. The apparatus of claim 6 wherein an index of refraction of the transparent plate in each region is different from an index of refraction of the transparent plate in each of the other regions.

12. A method for modulating a phase difference of a pair of coherent optical beams, the method comprising:
illuminating a transparent plate at a first time with a pair of coherent optical beams, the transparent plate having a first region having a first optical thickness and a second region having a second optical thickness, each of the coherent optical beams being incident at the transparent plate at one of the first and second regions wherein a phase difference of the pair of coherent optical beams exiting the transparent plate has a first value;
illuminating the transparent plate at a second time with the pair of coherent optical beams so that one of the coherent optical beams is incident at the transparent plate in a region different from the respective region for the coherent optical beam for the first time, wherein the phase difference of the pair of coherent optical beams exiting the transparent plate has a second value; and
illuminating the transparent plate at a third time with the pair of coherent optical beams so that one of the coherent optical beams is incident at the transparent plate in a region different from the respective region for the coherent optical beam for the second time, wherein the phase difference of the pair of coherent optical beams exiting the transparent plate has a third value.

13. The method of claim 12 wherein the illumination of the transparent plate at the first, second and third times is repeated periodically.

14. The method of claim 12 wherein the first, second and third values of the phase difference are −120°, 0° and 120°.

15. The method of claim 12 wherein the transparent plate is moved along a linear path that includes a location of incidence of the coherent optical beams for each of the first, second and third times.

16. The method of claim 12 wherein the transparent plate is moved along a circular path that includes a location of incidence of the coherent optical beams for each of the first, second and third times.

17. The method of claim 12 wherein the coherent optical beams are focused on a surface of the transparent plate.

18. An apparatus for modulating a phase difference of a pair of coherent optical beams, comprising:
a transparent plate having a first region having a first optical thickness and a second region having a second optical thickness, and adapted to receive a pair of coherent optical beams;
a cyclical motion mechanism coupled to the transparent plate and adapted for planar translation, each of the coherent optical beams being incident at the transparent plate at one of the first and second regions and being phase delayed according to the optical thickness at the respective region, wherein the location of incidence of each of the coherent optical beams traverses a cyclical path defined by the planar translation so that a phase difference of the coherent optical beams is periodically modulated according to a difference in the optical thicknesses as the locations of incidence of the coherent optical beams transition between the first and second regions.

19. The apparatus of claim 18 wherein the cyclical motion mechanism comprises a linear translation mechanism.

20. The apparatus of claim 18 wherein the cyclical motion mechanism comprises an orbital translation mechanism.

21. A fringe projection and imaging system, comprising:
a transparent plate having a first region having a first optical thickness and a second region having a second optical thickness, and adapted to receive a pair of coherent optical beams;
a cyclical motion mechanism coupled to the transparent plate and adapted for planar translation, each of the coherent optical beams being incident at the transparent plate at one of the first and second regions and being phase delayed according to the optical thickness at the respective region, wherein the location of incidence of each of the coherent optical beams traverses a cyclical path defined by the planar translation so that a phase difference of the coherent optical beams is periodically modulated according to a difference in the optical thicknesses as the locations of incidence of the coherent optical beams transition between the first and second regions;

an imager configured to acquire an image of a fringe pattern generated on a surface illuminated by the coherent optical beams after exiting the phase plate for a plurality of values of phase difference for the coherent optical beams; and a control module in electrical communication with the cyclical motion mechanism and the imager to synchronize the acquisition of the image of the fringe pattern at each of the phase differences.

22. The fringe projection and imaging system of claim 21 wherein the second region comprises two separated rectangular regions each having the second optical thickness and wherein the planar translation comprises a bidirectional linear translation.

23. The fringe projection and imaging system of claim 21 wherein the second region comprises two separated pie-shaped regions each having the second optical thickness and wherein the planar translation comprises an orbital motion.

* * * * *